(12) United States Patent
Schulz et al.

(10) Patent No.: US 8,134,321 B2
(45) Date of Patent: Mar. 13, 2012

(54) MOTOR CONTROL SYSTEM FOR ACHIEVING PEAK TORQUE

(75) Inventors: Steven E. Schulz, Torrance, CA (US); Bon Ho Bae, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 444 days.

(21) Appl. No.: 12/419,371

(22) Filed: Apr. 7, 2009

(65) Prior Publication Data

US 2010/0253252 A1  Oct. 7, 2010

(51) Int. Cl.
*H02P 7/00* (2006.01)
(52) U.S. Cl. ........................................ 318/432; 318/434
(58) Field of Classification Search .................. 318/432, 318/434, 727, 798, 799, 805, 812
See application file for complete search history.

(56) References Cited

U.S. PATENT DOCUMENTS

| | | | | |
|---|---|---|---|---|
| 5,443,970 A | * | 8/1995 | Blacker et al. | 435/125 |
| 5,477,163 A | * | 12/1995 | Kliman | 324/756.06 |
| 6,014,598 A | * | 1/2000 | Duyar et al. | 701/29 |
| 6,547,699 B2 | * | 4/2003 | Eich et al. | 477/175 |
| 6,953,409 B2 | * | 10/2005 | Schmidt et al. | 475/5 |

* cited by examiner

*Primary Examiner* — Rina Duda
(74) *Attorney, Agent, or Firm* — Ingrassia Fisher & Lorenz, P.C.

(57) ABSTRACT

In a motor controller, a modified interpolation technique uses an extrapolated torque command for the upper table to improve torque linearity under certain conditions. When the torque command input is greater than the max torque limit of a first look-up table, but less than the maximum torque limit of a second, adjacent look-up table, the desired current command is computed by interpolating between the maximum torque limit of the first table and a revised torque value for the second look-up table, wherein the revised torque value is determined by extrapolating from the maximum torque limit of the first look-up table through a torque value based on the torque command input.

12 Claims, 3 Drawing Sheets

MOTOR CONTROL SYSTEM FOR ACHIEVING PEAK TORQUE

TECHNICAL FIELD

The present invention generally relates to motor driver control systems, and more particularly relates to methods for optimizing peak torque in motors when operating above base speed.

BACKGROUND

A common architecture for motor control systems involves the storage of stator current command tables for multiple input DC voltages. For a given DC voltage, then, the current commands can be determined from the appropriate look-up table. In the event that the input voltage lies between two of the pre-stored tables, interpolation is used to determine the correct current command. However, in certain situations near peak torque, only valid operating commands are available in the upper table. This occurs when the torque command exceeds the peak torque limit of the lower Vdc table. In such a case, errors in interpolation can occur.

More particularly, FIG. 1 shows a block diagram of a typical AC motor drive control system 100. Control system 100 generally includes a set of look-up tables 104 taking inputs 102, a synchronous frame current regulator block 106, a synchronous-to-stationary transformation block 108, a two-to-three-phase transformation block 110, a 3-phase voltage source inverter 112, a three-to-two-phase transformation block 116, and a stationary-to-synchronous transformation block 114, all configured as a closed loop as shown, wherein inverter 112 is coupled a PM motor 118. A resolver 120 and associated resolver-to-digital converter 122 feed into blocks 108 and 114. Such functional blocks are known in the art, and need not be described in detail.

In order to achieve optimal performance over the wide range of expected DC link voltage and motor speed, current command information is often calculated off-line and stored. In this case, current commands for the synchronous frame current regulators 106 are stored in 2-dimensional look-up tables 104. The indexes into each table are torque and speed. Conventional motor control architectures have multiple tables for different DC voltages (e.g., 150, 200, 250, 300, 350, 400V, etc.). However, problems can occur when the actual voltage lies between two tables in the field weakening region.

For example, FIG. 2 represents the motor torque limit at two different voltages, in this case, 300V and 350V. If the actual DC voltage is 325V, the torque command is 125 Nm, and the speed is $n_1$ as shown. Since the command exceeds the 300V torque limit, the system is forced to compute the 300V command at the restricted level of p1 (100 Nm). From the 350V table, since the command is less than the limit (p4) the system computes the data at the desired level p2. It then linearly interpolates between the two results based upon voltage. Since 325V is half-way between 300 and 350V, the system would essentially average the two results, and end up somewhere between p1 and p2, at p3. However, the correct result, due to the non-linear nature of the curves, is actually at p2.

This is also illustrated in FIG. 3, which is a plot of the torque versus Vdc at a fixed speed Here, p1 and p4 represent the maximum torque values for the bounding DC voltages (300V and 350V). Conventional algorithms would return a result at point 304, while the desired point is 302.

Accordingly, it is desirable to provide improved motor drive control system algorithms that can better interpolate Vdc. Additional desirable features and characteristics of the present invention will become apparent from the subsequent detailed description and the appended claims, taken in conjunction with the accompanying drawings and the foregoing technical field and background.

BRIEF SUMMARY

In accordance with the present invention, a modified interpolation technique generally uses an extrapolated torque command for the upper table to improve torque linearity under certain conditions.

Systems and methods in accordance with various embodiments include: receiving a torque command input, a motor speed input, and a voltage input; accessing a plurality of look-up tables, each corresponding to adjacent values of the voltage input, each having an associated maximum torque limit, and each including a two-dimensional array of current commands indexed by values of the motor speed input and the torque command input; determining an applicable operating condition from a set of operating conditions, wherein the applicable operating condition corresponds to a first condition wherein the torque command input is greater than the max torque limit of a first look-up table, but less than the maximum torque limit of a second, adjacent look-up table; computing the desired current command by interpolating between the maximum torque limit of the first table and a revised torque value for the second look-up table, wherein the revised torque value is determined by extrapolating from the maximum torque limit of the first look-up table through a torque value based on the torque command input; and controlling the electric motor in accordance with the desired current command.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following discussion generally relates to a motor control system that incorporates improved interpolation techniques. In that regard, the following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to magnetism, permanent magnet machines, motors, and the like need not and are not described herein.

Figure 4:
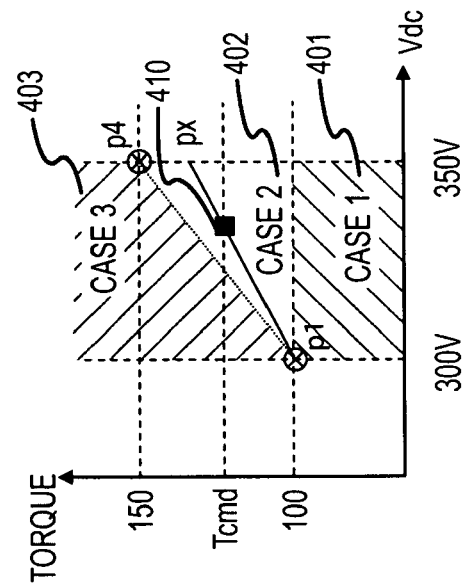
FIGS. 3 and 4 are torque vs. Vdc curves useful in describing the present invention.
Figure 3:
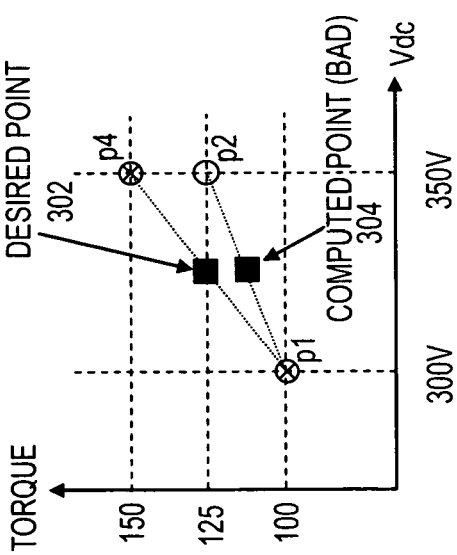

Referring now to the torque vs. Vdc plot shown in FIG. 4, a method in accordance with one embodiment will now be described. As illustrated, there are three cases (or operating conditions) to consider: Case 1 (region 401), where the torque command (Tcmd) is less than the torque limit at both end points; Case 2 (region 402), where the torque command is less than the max torque limit line (p1-p4), but exceeds the torque limit on one left side (p1); and Case 3 (region 403), where the torque command exceeds the torque limit line (p1-p4).

In Case 1, no special handling is necessary: conventional voltage interpolation provides an accurate result, i.e.:

$$x(V_{dc}) = (V_{dc} - V_{Low}) \cdot \left( \frac{x(V_{High}) - x(V_{Low})}{V_{High} - V_{Low}} \right) + x(V_{Low}) \quad (1)$$

or $$x(V_{dc}, T_{cmd}, n_r) = (V_{dc} - V_{Low}) \cdot \left( \frac{x_{V_{High}}(T_{cmd}, n_r) - x_{V_{Low}}(T_{cmd}, n_r)}{V_{High} - V_{Low}} \right) + x_{V_{Low}}(T_{cmd}, n_r)$$

where $V_{High}$ is the DC voltage of the upper bounding table (350V in the example), $V_{Low}$ is the DC voltage of the lower bounding table (300V in the example), $V_{dc}$ is the actual DC voltage, and x is the variable stored in the 2D look-up tables with torque and speed input (e.g. $I_{sd}^{e*}$ or $I_{sq}^{e*}$, the D and Q axis synchronous frame current commands). In this equation, the $x_{VHigh}$ is the 2D look-up table for higher DC voltage (e.g. 350V table) and the $x_{VHigh}$ is the 2D look-up table for lower available DC voltage (e.g. 300V table).

In case 2, it is desirable to extrapolate along the line connecting p1 to the desired point to obtain, point px. Then the 2D table look-up algorithm described above can be performed using T(px) as torque command input for the upper bound voltage, while T(p1) is used as the torque command input for the lower bound voltage. In this way, the desired point (410) can be achieved after voltage interpolation:

$$T(px) = (V_{High} - V_{Low}) \cdot \left( \frac{T_{cmd} - T(p1)}{V_{dc} - V_{Low}} \right) + T(p1). \quad (2)$$

$$x(V_{dc}) = (V_{dc} - V_{Low}) \cdot \left( \frac{x(px) - x(p1)}{V_{High} - V_{Low}} \right) + x(p1)$$

$$T(px) = (V_{High} - V_{Low}) \cdot \left( \frac{T_{cmd} - T(p1)}{V_{dc} - V_{Low}} \right) + T(p1)$$

$$x(V_{dc}, T_{cmd}, n_r) = (V_{dc} - V_{Low}) \cdot \left( \frac{x_{V_{High}}(T(px), n_r) - x_{V_{Low}}(T(p1), n_r)}{V_{High} - V_{Low}} \right) + x_{V_{Low}}(T(p1), n_r)$$

where p1 is the operating point at $V_{Low}$ and maximum torque for that voltage, px is the operating point to be used for indexing into the table at $V_{High}$, T(p1) is the torque value at p1, and T(px) is the torque value at px.

Finally, in Case 3, the system limits the result to the torque limit line (p1-p4). This is shown in Equation 3:

$$x(V_{dc}) = (V_{dc} - V_{Low}) \cdot \left( \frac{x(p4) - x(p1)}{V_{High} - V_{Low}} \right) + x(p1) \quad (3)$$

$$x(V_{dc}, T_{cmd}, n_r) = (V_{dc} - V_{Low}) \cdot \left( \frac{x_{V_{High}}(T(p4), n_r) - x_{V_{Low}}(T(p1), n_r)}{V_{High} - V_{Low}} \right) + x_{V_{Low}}(T(p1), n_r)$$

where p4 is the operating point at $V_{High}$ and maximum torque for that voltage.

Using the equations 1 through 3 above, the current commands can be computed with minimal impact of voltage interpolation errors.

Figure 1:
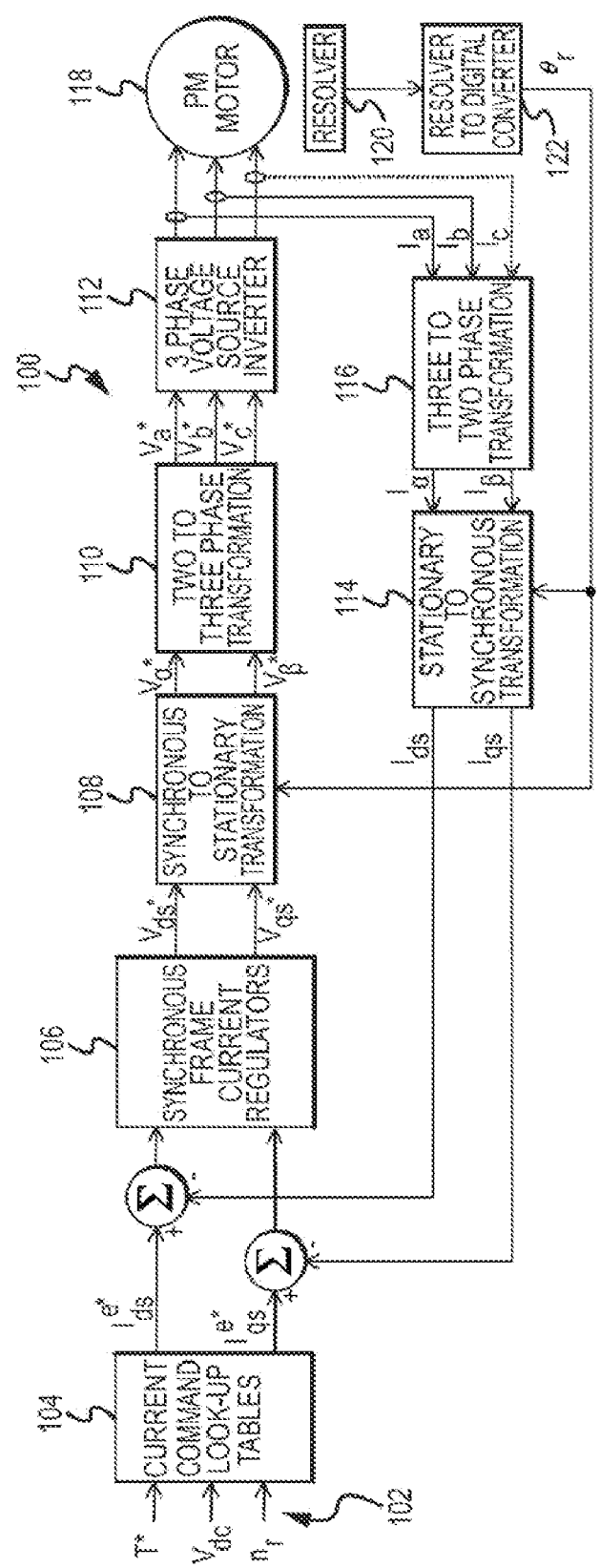
FIG. 1 is a conceptual block diagram of a typical AC motor drive control system.
Figure 2:
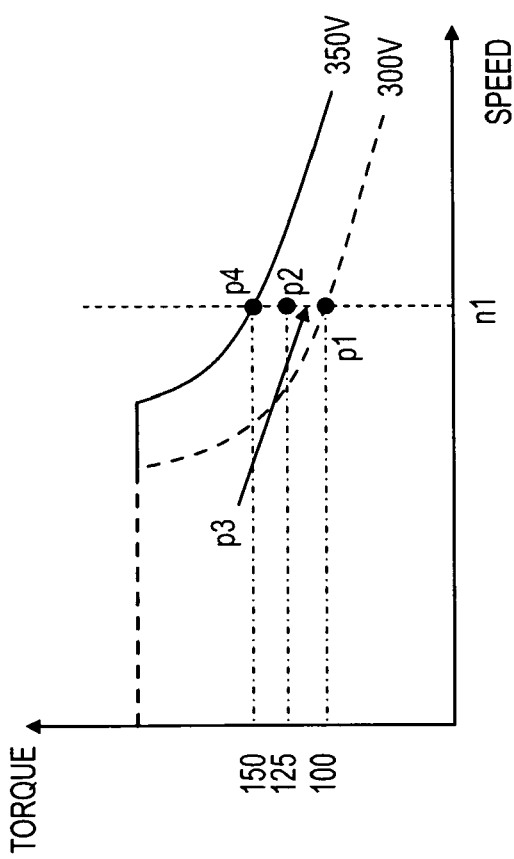
FIG. 2 shows motor torque limits in exemplary systems.

The method described above can be implemented in any combination of hardware, software, and firmware. For example, a general purpose computer may employ machine-readable media and program instructions included thereon. Alternatively, any combination of digital and analog components may be used and incorporated into a control system as shown in FIG. 1. Look-up tables such as those described may be stored in flash memory or any other suitable storage medium.

Figures 5, 6:
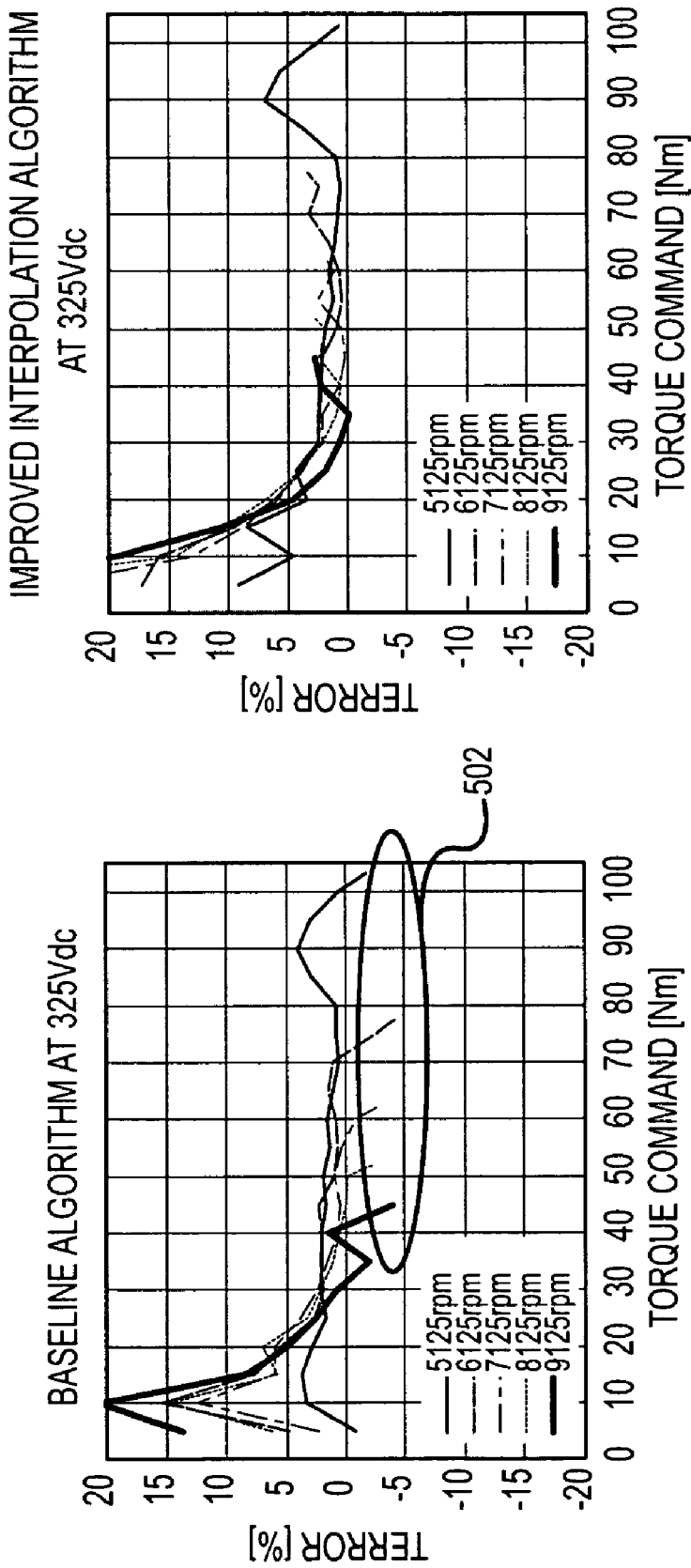
FIGS. 5 and 6 are torque error vs. torque command curves useful in describing the present invention.

Systems in accordance with the present invention have been found to exhibit numerous advantages. For example, FIG. 5 illustrates the torque error vs. torque command of a baseline motor and control system that does not implement the present invention. Data was taken when the actual operating voltage (325V) lay halfway between the bounding tables (300V and 350V). Each curve represents a different motor speed. Moving to the right on any curve represents increased torque request. The error is plotted as percentage of commanded torque. At low torque commands, the error generally increases due to fixed offsets, etc. The right hand end of each curve represents the peak torque points. The right-most points on each curve drop off significantly, as indicated by data points in region 502. Under these conditions, the peak torque is being restricted.

In contrast, FIG. 6 depicts the same test results when methods in accordance with the present invention have been utilized. Notably, the peak torque points no longer fall off as before, indicating that the peak torque has increased. In general, peak torque increased up to 5% when operating above base speed. Furthermore, the present method also provides improved torque linearity when operating near peak torque above base speed. The illustrated experiment was performed with a 80 kW (peak) interior permanent magnet motor suitable for EV/HEV traction applications. A three phase, current regulated, voltage source inverter was used to drive the motor, and the exemplary algorithm was encoded into a microprocessor controlling the inverter. Testing was performed on a dynamometer, which included an absorber motor to accurately control the speed, a regulated DC power supply to provide the DC link voltage, and a torque transducer to measure the actual motor torque.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. The foregoing detailed description provides those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A motor control system comprising:
    an electric motor,
    a control system coupled to the electric motor and configured to receive a torque command input, a motor speed input, and a voltage input;
    a plurality of look-up tables, each corresponding to adjacent values of the voltage input, each having an associated maximum torque limit, and each including a two-dimensional array of current commands indexed by values of the motor speed input and the torque command input; wherein the control system is configured to control the electric motor in accordance with the current commands;

wherein the control system is configured to determine an applicable operating condition from a set of operating conditions and determine a corresponding desired current command;

wherein one of the operating conditions corresponds to a first condition wherein the torque command input is greater than the max torque limit of a first look-up table, but less than the maximum torque limit of a second, adjacent look-up table, and wherein the corresponding desired current command is computed by interpolating between the maximum torque limit of the first table and a revised torque value for the second look-up table;

wherein the revised torque value is determined by extrapolating from the maximum torque limit of the first table through a torque value based on the torque command input.

2. The motor control system of claim 1, wherein the set of operating conditions further includes a second condition wherein the torque command input is less than the maximum torque limit of the first look-up table, but less than the maximum torque limit of the second look-up table.

3. The motor control system of claim 2, wherein, after determining that the applicable operating condition is the second operating condition, the control system is configured to compute the desired current command by interpolating between the first and second look-up tables.

4. The motor control system of claim 2, wherein the set of operating conditions further includes a third condition wherein the torque command input is greater than the max torque limit of the first look-up table, and greater than the maximum torque limit of the second look-up table.

5. The motor control system of claim 4, wherein, after determining that the applicable operating condition is the third operating condition, the control system is configured to compute the desired current command by interpolating between the maximum torque limit of the first look-up table and the maximum torque limit of the second look-up table.

6. The motor control system of claim 3, wherein the control system is configured to compute the desired current command using the relation:

$$T(px) = (V_{High} - V_{Low}) \cdot \left( \frac{T_{cmd} - T(p1)}{V_{dc} - V_{Low}} \right) + T(p1)$$

$$x(V_{dc}) = (V_{dc} - V_{Low}) \cdot \left( \frac{x(px) - x(p1)}{V_{High} - V_{Low}} \right) + x(p1)$$

wherein $V_{Low}$ corresponds to the first look-up table, $V_{High}$ corresponds to the second look-up table, p1 is the operating point at $V_{Low}$ and maximum torque limit for that voltage, px is the operating point to be used for indexing the second look-up table at $V_{High}$, T(p1) is the torque value at p1, and T(px) is the torque value at px.

7. A method for controlling an electrical motor, comprising:

receiving a torque command input, a motor speed input, and a voltage input;

accessing a plurality of look-up tables, each corresponding to adjacent values of the voltage input, each having an associated maximum torque limit, and each including a two-dimensional array of current commands indexed by values of the motor speed input and the torque command input;

determining an applicable operating condition from a set of operating conditions, wherein the applicable operating condition corresponds to a first condition wherein the torque command input is greater than the max torque limit of a first look-up table, but less than the maximum torque limit of a second, adjacent look-up table, computing the desired current command by interpolating between the maximum torque limit of the first table and a revised torque value for the second look-up table, wherein the revised torque value is determined by extrapolating from the maximum torque limit of the first look-up table through a torque value based on the torque command input; and controlling the electric motor in accordance with the desired current command.

8. The method of claim 7, wherein the set of operating conditions further includes a second condition wherein the torque command input is less than the maximum torque limit of the first look-up table, but less than the maximum torque limit of the second look-up table.

9. The method of claim 8, wherein, after determining that the applicable operating condition is the second operating condition, the control system is configured to compute the desired current command by interpolating between the first and second look-up tables.

10. The method of claim 8, wherein the set of operating conditions further includes a third condition wherein the torque command input is greater than the max torque limit of the first look-up table, and greater than the maximum torque limit of the second look-up table.

11. The method of claim 10, wherein, after determining that the applicable operating condition is the third operating condition, the control system is configured to compute the desired current command by interpolating between the maximum torque limit of the first look-up table and the maximum torque limit of the second look-up table.

12. The method of claim 7, the desired current command is computed using the relation:

$$T(px) = (V_{High} - V_{Low}) \cdot \left( \frac{T_{cmd} - T(p1)}{V_{dc} - V_{Low}} \right) + T(p1)$$

$$x(V_{dc}) = (V_{dc} - V_{Low}) \cdot \left( \frac{x(px) - x(p1)}{V_{High} - V_{Low}} \right) + x(p1)$$

wherein $V_{Low}$ corresponds to the first look-up table, $V_{High}$ corresponds to the second look-up table, p1 is the operating point at $V_{Low}$ and maximum torque limit for that voltage, px is the operating point to be used for indexing the second look-up table at $V_{High}$, T(p1) is the torque value at p1, and T(px) is the torque value at px.

* * * * *